United States Patent [19]

Horowitz

[11] 3,824,332

[45] July 16, 1974

[54] PAY TELEVISION SYSTEM

[75] Inventor: Irving Horowitz, Eatontown, N.J.

[73] Assignee: Teleglobe Pay TV System Inc., New York, N.Y.

[22] Filed: Feb. 18, 1972

[21] Appl. No.: 227,582

[52] U.S. Cl. .................................................. 178/5.1
[51] Int. Cl. ................................................ H04n 1/44
[58] Field of Search ........................................ 178/5.1

[56] References Cited

UNITED STATES PATENTS

| | | | |
|---|---|---|---|
| 2,972,009 | 2/1961 | Roschke | 178/5.1 |
| 3,081,376 | 3/1963 | Loughlin et al. | 178/5.1 |
| 3,440,338 | 4/1969 | Walker | 178/5.1 |

*Primary Examiner*—Maynard R. Wilbur
*Assistant Examiner*—S. C. Buczinski
*Attorney, Agent, or Firm*—Michael S. Striker

[57] ABSTRACT

Reference pulses of opposite polarity to the horizontal sync pulses are added to the composite television signal just preceeding each horizontal sync pulse. The video portion of the signal is inverted for randomly selected fields. Coding bursts are added to the composite signal to indicate whether subsequent field is inverted. Transmitter clamped to reference pulse level. Reference pulse used for AGC in decoder. Video portion of received signal inverted in accordance with coding bursts. Audio program signals encoded by modulation on suppressed carrier centered above audio range. Barker signals transmitted on normal audio frequencies.

45 Claims, 16 Drawing Figures

PAY TELEVISION SYSTEM

BACKGROUND OF THE INVENTION:

This invention relates to pay television systems. It is the object of such television systems to encode the signal at the transmitter in such a manner that a receiver cannot furnish a picture unless a decoder is activated by the subscriber. Activation of the decoder of course leads to charges for the program received. In known methods and arrangements of the above-described types, the transmitted signal is encoded by varying the timing between the video and synchronizing components, that is selectively retarding or advancing the video component relative to the synchronizing signals. Key signals are then transmitted which indicate the necessary retardation or advance of the signal which must be effected in the receiver in order that the final system furnished to a paying subscriber may have the video portion of the signal in the correct relationship relative to the synchronizing portion.

In other known systems of the above-described type, the coding operates on the synchronizing portions of the signal. For example, the field synchronizing components of the television signal may be frequency modulated on the picture carrier, while the line synchronizing components are coded and then transmitted to subscriber receivers concurrently with the sound-signal components on a sound carrier. Key signals indicating the coding schedule of the line synchronizing components are transmitted to subscriber receivers over a separate channel. Both of the above-described systems have definite drawbacks. The first lends itself rather readily to unauthorized decoding, the second requires a great deal of extra equipment since a standard television transmitter cannot be used.

SUMMARY OF THE INVENTION:

It is an object of the present invention to furnish an encoding and decoding system and method which allows use of a standard transmitter, requires relatively little additional equipment and still has a high immunity to unauthorized decoding.

It is a further object of the present invention to furnish a method and system for encoding and decoding the audio signal associated with the program to be transmitted, to prevent reception of said audio signal without use of the decoding unit.

It is a further object of the present invention to provide a Barker audio signal which is audible on a standard television signal without decoding, to give the information required by the subscriber to decide whether or not to pay for the particular program.

In accordance with the present invention, a standard composite television signal having a video signal with a determined black level signifying picture black and further having synchronizing signals of a determined synchronizing level and polarity relative to said black level is encoded by the following steps:

First, a sequence of reference pulses having a polarity opposite to said synchronizing polarity, each displaced by a determined time interval from a corresponding one of said synchronizing signals, is generated. Said sequence of reference pulses is combined with said composite television signal. The resulting signal, including all synchronizing and video portions, is transmitted, but the reference pulse occupies the levels normally associated with the horizontal synchronizing signals. The width of the reference pulse is not sufficiently wide to allow synchronizing of a receiver onto said reference pulse.

The transmitted signal is further encoded by reversing the polarity of the video signal during randomly selected fields. Encoding bursts are injected into the composite signal prior to transmission to indicate whether or not the subsequent field has a video portion to be inverted.

The audio portion of the program is encoded by modulating said program audio signals onto a suppressed carrier. In a preferred embodiment of the present invention, said suppressed carrier is derived from the horizontal synchronizing signals and has a frequency equal to twice the horizontal line frequency. The frequency range normally occupied by the program audio signals is used to transmit a barker signal giving information about the program to the subscriber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
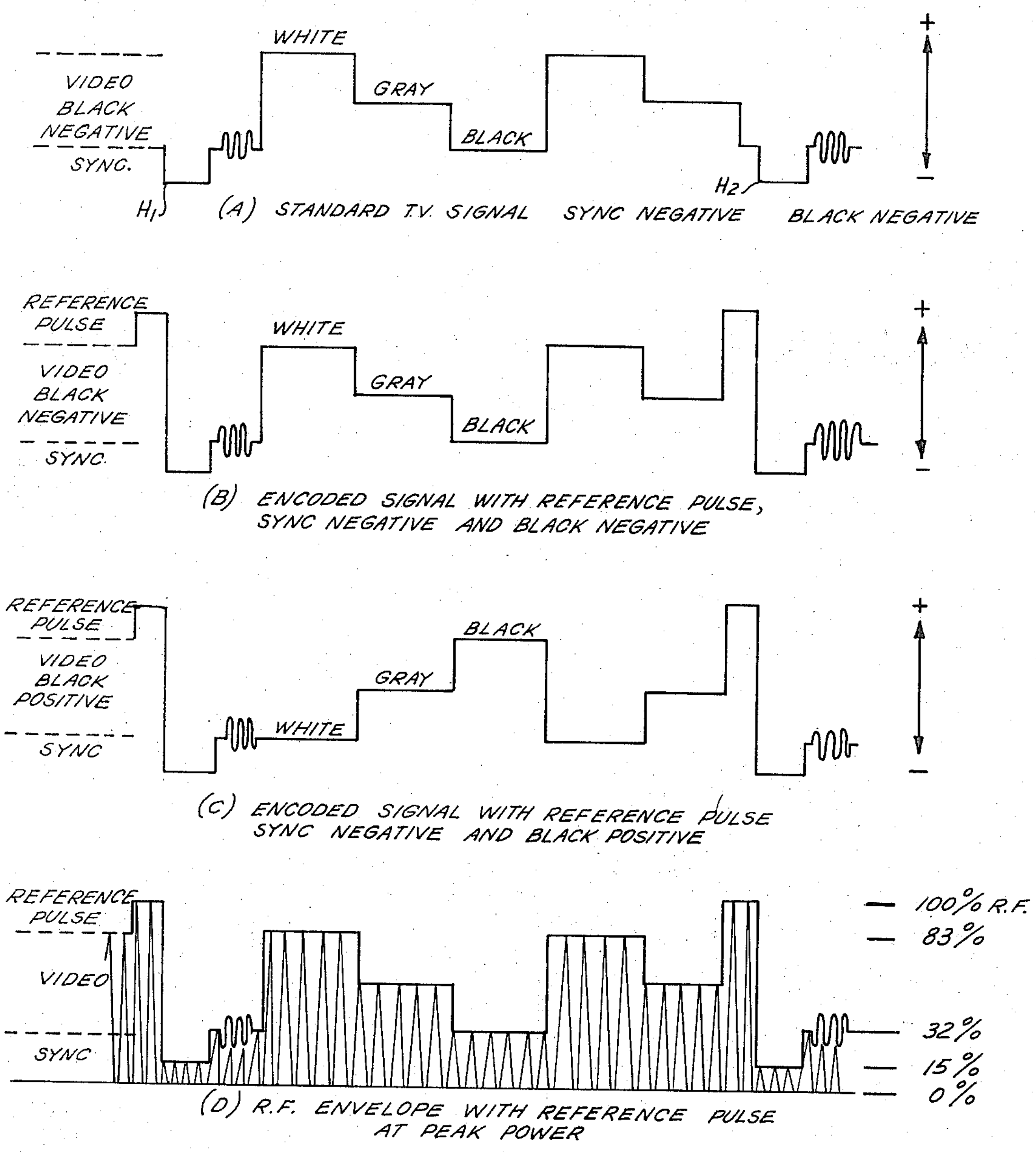
FIG. 1 shows the unencoded and encoded television signals of the present invention.

DESCRIPTION OF THE PREFERRED EMBODIMENTS:

A preferred embodiment of the present invention will now be described with reference to the drawing.

The underlying principle of the present invention is best understood with reference to FIG. 1 which shows the wave forms of both the standard television signal on which the encoder of the present invention operates and the signals following the encoding. Reference to line A shows a standard televison wignal having a black negative level and negative synchronization pulses. In particular, line A shows the interval between two sequential horizontal synchronization pulses. The horizontal synchronization pulses are labelled respectively $H_1$ and $H_2$. On the back porch of the horizontal synchronization pulses are the color bursts which form part of the standard color television signal. Following the color bursts is the video portion of the signal. This is indicated in stylized form, that is a white, grey and black level as shown. Of course the actual video signal would have variations between these various levels depending upon the picture to be transmitted. In accordance with the present invention, the above-described signal is encoded in two ways; first a reference pulse is added on the front porch of the horizontal synchronizing signals and the signal is transmitted in such a manner that the reference pulse occupies the amplitude levels and has the polarity normally associated with the synchronization signal. Although the horizontal and vertical synchronization signals are transmitted, these are transmitted at opposite polarity to their usual polarity, thereby preventing a receiver receiving such as encoded signal from synchronizing thereto. Further, the width of the reference pulses is made sufficiently narrow that the synchronizing circuits of the receiver do not respond thereto. Thus the receiver receiving such an encoded signal will see an image which is unsynchronized both horizontally and vertically, unless the decoder is activated by the subscriber.

As an additional measure, the video portion of the signal indicated by the white, grey and black levels in the standard signal described above is inverted during some fields. The signal is either transmitted in the standard black negative or in a black positive fashion throughout any one particular field, but the video sense may be reversed either from field to field, or else randomly as will be described below. Thus not only is the received signal, if not decoded, unsynchronized, but also the video levels are inverted. On a normal black and white television receiver a substantially blank resister will result. On a color receiver the luminance portion of the signal would at least partially cancel out. Since on opposite polarity fields, the chrominance signal will be 180° out of phase while the sense of the color burst remains unchanged, the colors visible will have no discernible relation to the true information and will flicker strongly according to the random switching rate. Further the lack of horizontal synchronization will also cause the color burst gate to be unsynchronized with the color burst and on most receivers no color would be visible.

Line B of FIG. 1 shows the encoded signal including the reference pulse. In this case the video portion of the signal has not been inverted and the black negative level still exists. In the following line, line C, the encoded signal with reference pulse, and sync negative, black positive level is shown.

Line D of FIG. 1 shows the RF envelope and indicates that the reference pulse represents peak power from the transmitter. It should be noted with reference to this Figure that he video transmitter sees a standard composite television signal except for the absence of the front porch of the horizontal synchronization pulses. The transmitter clamps at the pulse tip of the reference pulse instead of at the pulse tip of the synchronization pulses. A standard transmitter can thus be used without modification.

Figure 2:
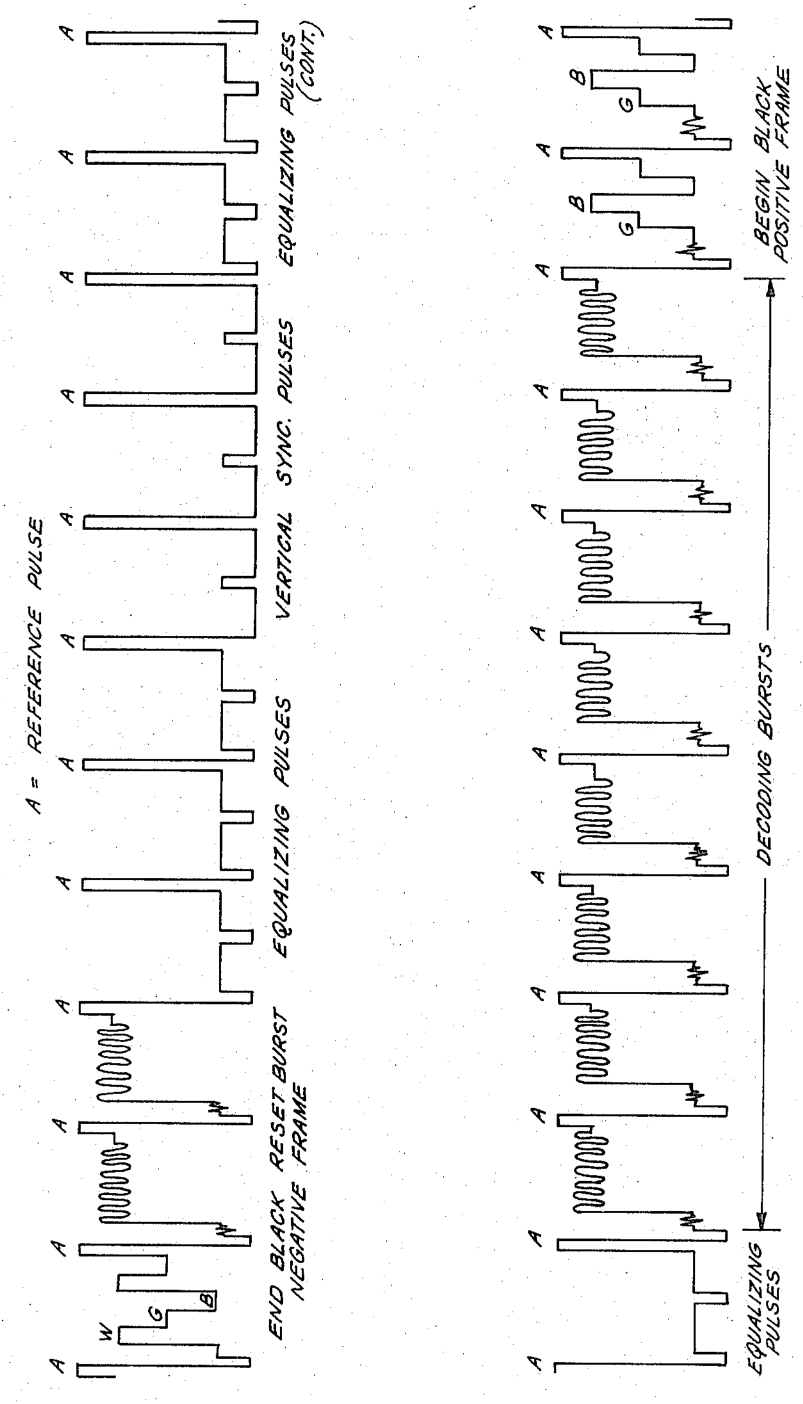
FIG. 2 shows the vertical blanking interval of an encoded television signal in accordance with the present invention.

FIG. 2 shows the vertical blanking interval of the standard television signal after encoding. It will be noted that it is a standard vertical blanking interval with the vertical synchronizing pulses and equalizing pulses intact. The only difference is that the reference pulses have been added on the front porch of the horizontal sync pulses. Further it will be noted that decoding bursts have been added following the equalizing pulses. It is the function of these decoding bursts to indicate the polarity of the video signal for the subsequent field, that is whether the subsequent field will have a black positive or a black negative level. Further it will be noted that just prior to the first equalizing pulses reset bursts are added. As will be described in more detail below, it is the function of the reset burst to reset the gate which determines the polarity of the subsequent frame. The use of these reset bursts allows a minimum equipment to be used in the decoders. Of course this is particularly desirable since there is a far larger number of decoders required than the signal encoder at the transmitter. In the simplet possible embodiment of the present invention it is of course possible to use a single decoding burst to indicate that the subsequent frame will be black positive, for example, and to use the absence of decoding bursts to indicate a black negative frame. This type of system, although simplest, offers the least security. In order to achieve greater security the decoding bursts may contain bursts of a number of frequencies and as many as eight bursts may be used. Thus a great flexibility in encoding to signify the polarity of the next frame is available.

Figure 3:
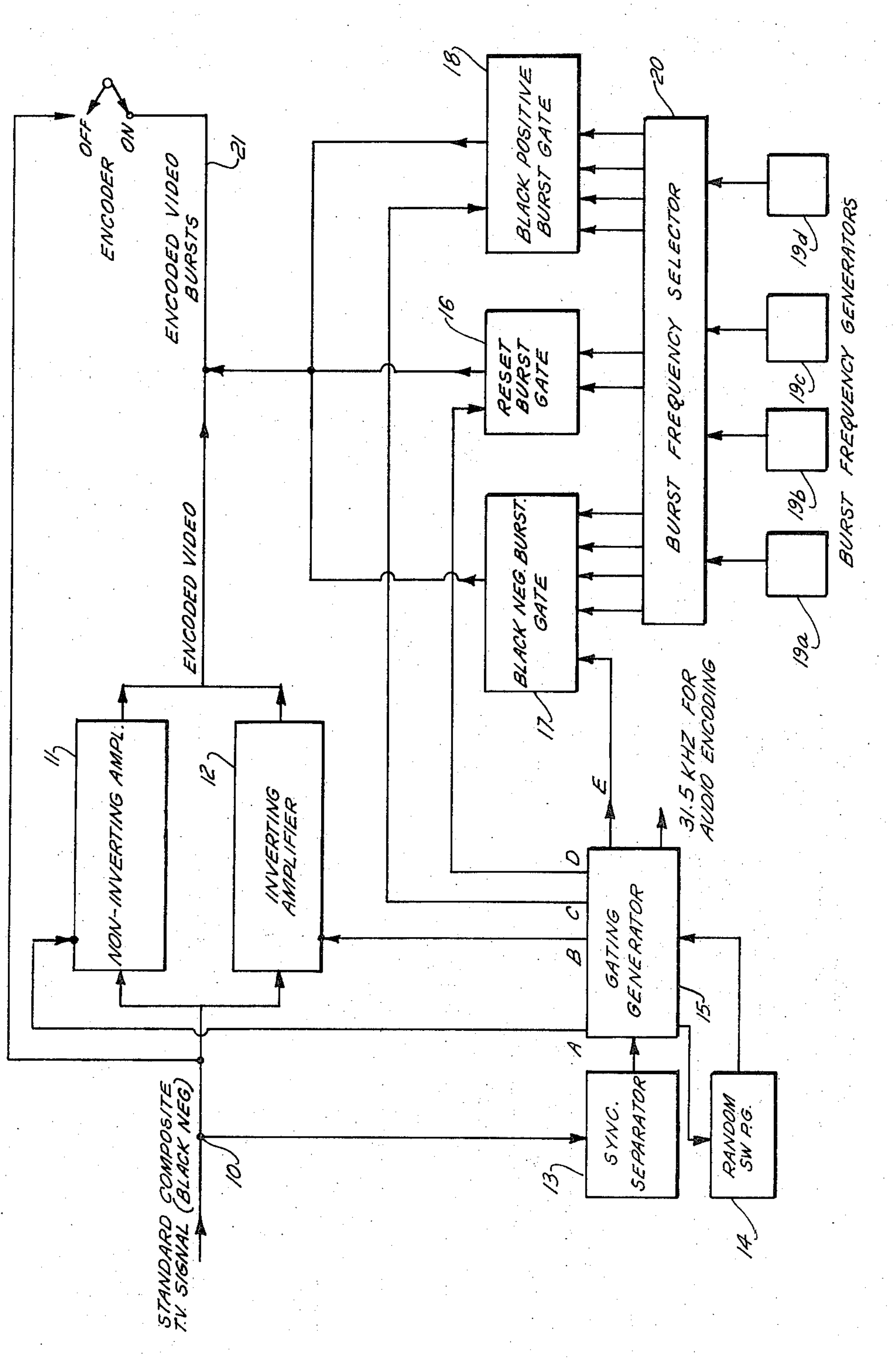
FIG. 3 is a block diagram of the encoder unit.

The block diagram of the video encoder is shown in FIG. 3. A standard composite television signal (black negative) is furnished at input terminal 10. All parts of the signal received at terminal 10 are transmitted through the non-inverting amplifier 11 except that the video portion of those fields for which the video portion is to be inverted is transmitted through inverting amplifier 12. Since the incoming standard composite television signal is simultaneously applied to the input of both amplifier 11 and amplifier 12, it is obvious that gating signals will have to be provided to switch one amplifier on and one amplifier off at all times. The only exception is that with particular techniques used in the present invention both amplifiers are cut off (furnishing $B^+$ voltage) for forming of the reference pulse. This furnishes an extremely reliable reference.

The required enabling wignals are furnished by gating generator 15, specifically, the signal on line A enables amplifier 11, while the signal on line B enables amplifier 12. The gating generator in turn is controlled by the horizontal and vertical synchronization signals derived from the incoming composite television signal by means of a standard sync separator 13. The output of the sync separator is also used to sample the output of a random switching pulse generator whose so-sampled output is used to determine whether or not the video portion of the subsequent field is to be inverted, that is whether or not the signal on line B is to appear during the subsequent field. The sync separator 13 is a standard circuit which may for example be found in FIG. 4 in "Television Service Manual" 3rd Edition, second printing, 1970, published by Theodore Audel & Co. The circuits associated with units 14 and 15 will be discussed in detail below. For the present it is sufficient that an encoded video signal is derived at the combined outputs of amplifiers 11 and 12. It is further of course necessary that the reset bursts be added to the encoded signal. This is accomplished by enabling reset burst gate 16 via and output D of gating generator 15 at the time of the two horizontal line intervals immediately preceding the equalizing pulses in the vertical blanking interval (see also FIG. 2). It is further essential that the decoding burst indicated as following the equalizing pulses during the vertical blanking interval (again see FIG. 2) be added to the encoded video signal. This is accomplished by enabling either black negative burst gate 17 or black positive burst gate 18 via lines E and C, respectively. Of course, as mentioned above, in the simplest case one of gates 17 and 18 may be eliminated entirely and a single gate may be enabled to indicate a selected video polarity. In the Figure a plurality of burst frequency generators, namely generators 19*a* through 19*d* are shown. Further shown is a burst frequency selector 20 which may comprise manually set switches interconnecting the burst frequency generators with one of the gates 16, 17 or 18. The selected bursts are then applied to the encoded video signal whenever a particular gate is enabled as discussed above. It should further be noted that gates 16, 17 and 18 must be followed by a stage having a high output impedance prior to connection to the video throughline 21 carrying the encoded video signals, to prevent excessive loading of this line. Burst frequency generators 19*a* through 19*d* are standard oscillators furnishing frequencies of between 0.2 and 2 MHZ. A suitable circuit for one of the burst gates 16 through 18 and including a suitable circuit to effect the high output impedance mentioned above is shown in FIG. 9 and will be discussed in detail following the description of said Figure.

Figure 4:
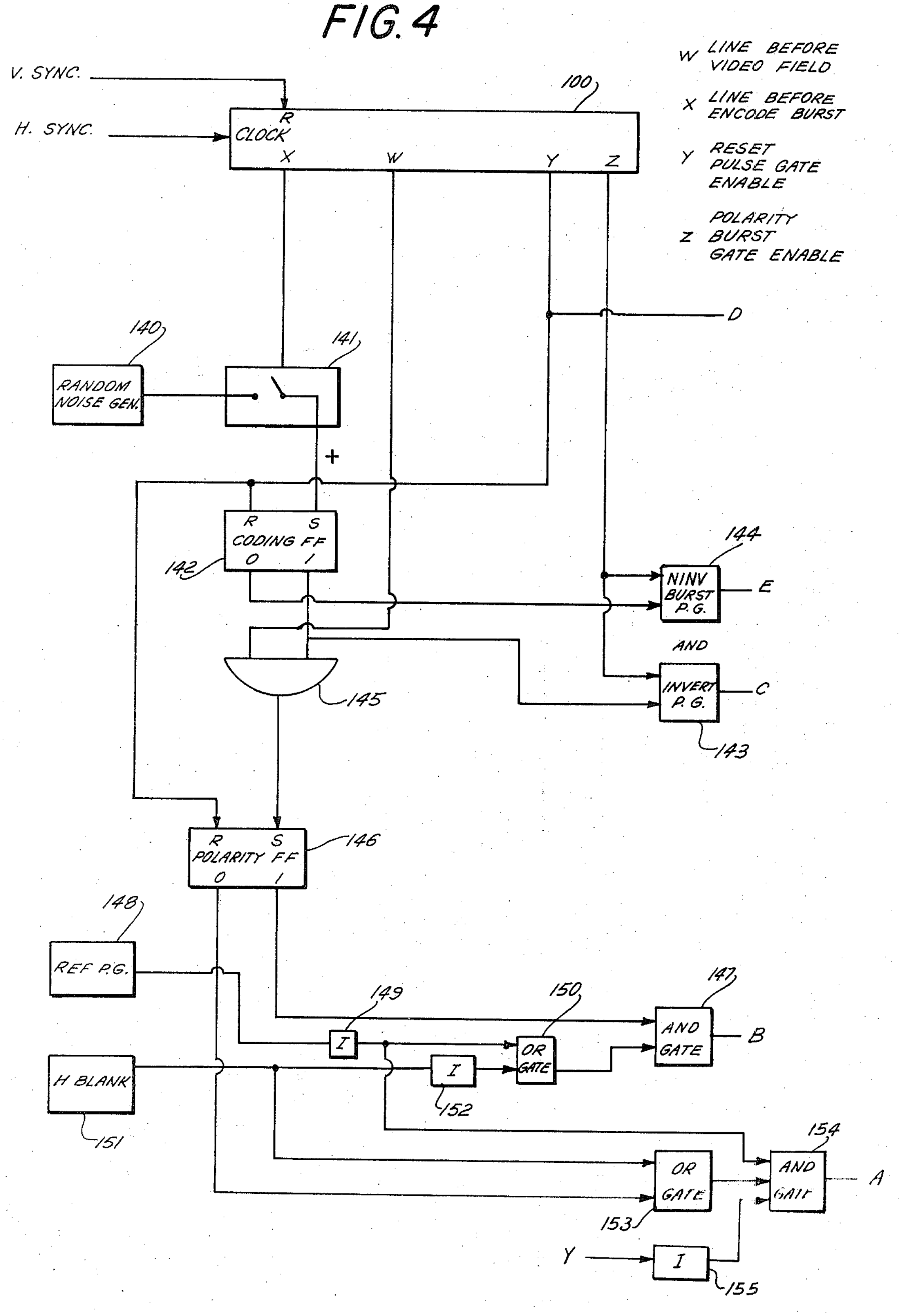
FIG. 4 is a more detailed block diagram of the gating generator of FIG. 3.

A more detailed diagram of the gating generator 15 of FIG. 3 is shown in FIG. 4. It should be noted with reference this Figure and all other block diagrams of this application, that a "1" output and a "O" output of a flip-flop refer to the states wherein the so-labelled outputs are enabled.

FIG. 4 shows a counter, 100, to whose count and reset inputs are, respectively, applied the horizontal and vertical synchronizing pulses derived from sync separators 13 of FIG. 3. This counter is an 8-bit counter and from it may be derived signals signifying particular lines in a given field. The random switching pulse generator 14 of FIG. 3 is shown embodied in a random noise generator 140 whose output comprises both positive and negative signals appearing randomly with respect to time. The output of random noise generator 140 is sampled by a sampling gate 141. When the counter output furnishes a signal corresponding to the line before the coding bursts, a switch 141 is closed to sample the state of the random noise generator. If the output of random noise generator 140 is a positive output, this will cause a setting of coding flip-flop 142 i.e., the "1" output is enabled. "1" Output of coding flip-flop 142 signifies that the video portion of the subsequent field is to be inverted. Thus it is necessary to enable inverting amplifier 12 during the video portion of the subsequent field, although non-inverting amplifier 11 must be activated during the horizontal blanking interval as well as the vertical blanking interval even during fields having an inverted video signal. Further it is necessary to insert the appropriate coding bursts, that is to enable black positive burst gate 18 at the correct times during the vertical blanking interval (see FIG. 2). Thus signal C (the enable signal for gate 18) must be furnished during the particular lines immediately preceding the black positive field, and at such times as do not include the reference pulse and horizontal blanking pulse. The timing for activating line C of FIG. 3 is indicated as coming from terminal Z of counter 100. This is a schematic indication signifying a timing corresponding to the lines for which the coding bursts are required. In theory and in the simplest case it could of course be only a single line during the vertical blanking interval. Of course if the output of the coding flip-flop 142 had been a "0" the inverting burst pulse gate enable signal E would have been generated instead of the signal C. Signal E would be generated through AND gate 144. AND gate 144 furnishes signal E in response to a "0" output of flip-flop 142 occurring simultaneously with signal Z.

A "1" output of flip-flop 142 occurring simultaneously with a signal from terminal W of counter 100 causes an output to appear at the output of AND gate 145 which in turn sets a polarity flip-flop 146. The signal on line W is a signal signifying the line before the video portion of the subsequent field. It will be noted that both the coding flip-flop 142 and polarity flip-flop 146 are reset by a signal appearing at terminal Y of counter 100. This terminal schematically indicates the time for the reset pulse gate enable signal D of FIG. 3. It will be seen that this occurs during the two lines immediately preceding the equalizing pulses in the vertical blanking interval. Again the reset pulses are timed to avoid interference with either the reference pulse, the horizontal synchronizing pulse or the color burst. Since the resetting of the flip-flop is accomplished by the first of these pulses, the second of course will be ineffective and is used for reliability only. It will be noted that polarity flip-flop 146 has a "1" output only when the coding flip-flop indicated that the video polarity of the next field is to be inverted and for a time period extending from the time that the flip-flop is set, namely from the timing of output W of counter 100, to the timing of output Y of counter 100. In other words, the whole vertical blanking interval is excluded as having a possible "1" output of flip-flop 146. Actually, reference to FIG. 2 will show that the output of flip-flop 146 ceases just prior to the beginning of the blanking interval, that is the last two lines of the preceding field are also excluded. Thus signal B which appears at the output of AND gate 147, one of whose inputs is the "1" output of flip-flop 146, can exist only in portions of the signal not including the vertical blanking interval. It is of course further also required to eliminate signal B during the times of the reference pulse and of the horizontal blanking interval. This is accomplished by taking the output of reference pulse generator 148, inverting it in inverter 149, and combining it in an OR gate 150 with the output of horizontal blanking generator 151, after inversion of said output by inverter 152. The output signal of OR gate 150 constitutes the second input of AND gate 147. It is thus seen that signal B will appear only for a "1" output of coding flip-flop 142 and only for that portion of the composite video signal which carries the actual video information. The synchronizing intervals will always pass through non-inverting amplifier 11, since amplifier 12 will never be activated at times corresponding to said signals.

At any time that signal B is not available, signal A must of course be available except during the reference pulse, which, in accordance with a preferred embodiment of the present invention, is inserted into the television signal by cutoff of the amplifiers (11 or 12) passing the signal. It is thus seen that signal A is present when polarity flip-flop 146 has a "O" output and also during the horizontal blanking intervals. Again, it should be remembered that the "zero" output of flip-flop 146 is present throughout the vertical blanking interval.

The horizontal blanking generator 151 of FIG. 4 may be a simple monostable multivibrator which is switched to the nonstable state by the leading edge of the horizontal sync pulse and returns to the stable state after a predetermined interval which is set to coincide with the horizontal sync pulse interval including the back porch in order to permit transmittal of the color burst.

Figure 5A:
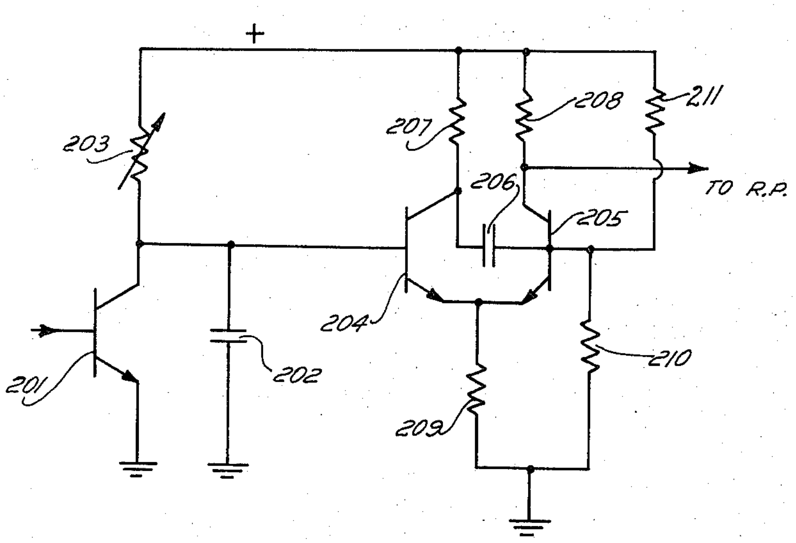
FIGS. 5*a* and 5*b* show, respectively, the reference pulse generator and corresponding waveforms.

FIG. 5a shows the reference pulse generator. As shown in said Figure, horizontal synchronzing pulses are applied to the base of a transistor 201 whose collector is connected to the positive supply line through a variable resistance 203 and to ground via a capacitor 202. The collector is further connected to the positive supply line via a resistance 207 and to the base of a transistor 205 via a capacitor 206. The collector of transistor 205 is connected to the positive supply line through a resistance 208, while the emitters of transistors 204 and 205 are connected to ground potential through a resistance 209.

Figure 5B:
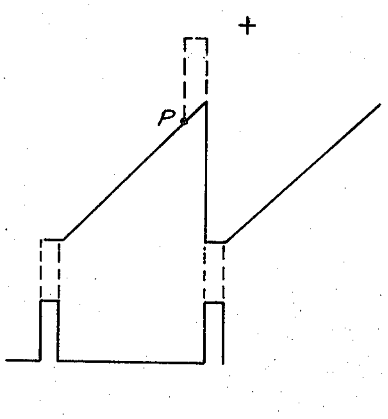

As shown in FIG. 5*b* capacitor 202 charges in a substantially linear fashion through resistance 203 (which thereby determines the charging rate) while transistor 201 is non-conductive. The horizontal synchronizing pulses applied at the base of transistor 201 switch the transistor to a conductive state shortcircuiting capacitor 202, and thereby discharging it. It will be noted that when the voltage across capacitor 202 reaches the point indicated by P in FIG. 5*b*, transistor 204 becomes conductive, causing transistor 205 to become non-conductive, and the voltage at its collector to assume substantially the voltage of the positive line. This results in the generation of the reference pulse which persists until receipt of the next subsequent horizontal synchronizing pulse at the base of transistor 201. It is thus seen that the leading edge of the reference pulse occurs at a predetermined time preceding the next sequential horizontal synchronizing pulse, which its trailing edge coincides with the leading edge of said horizontal synchronizing pulse.

Figure 6:
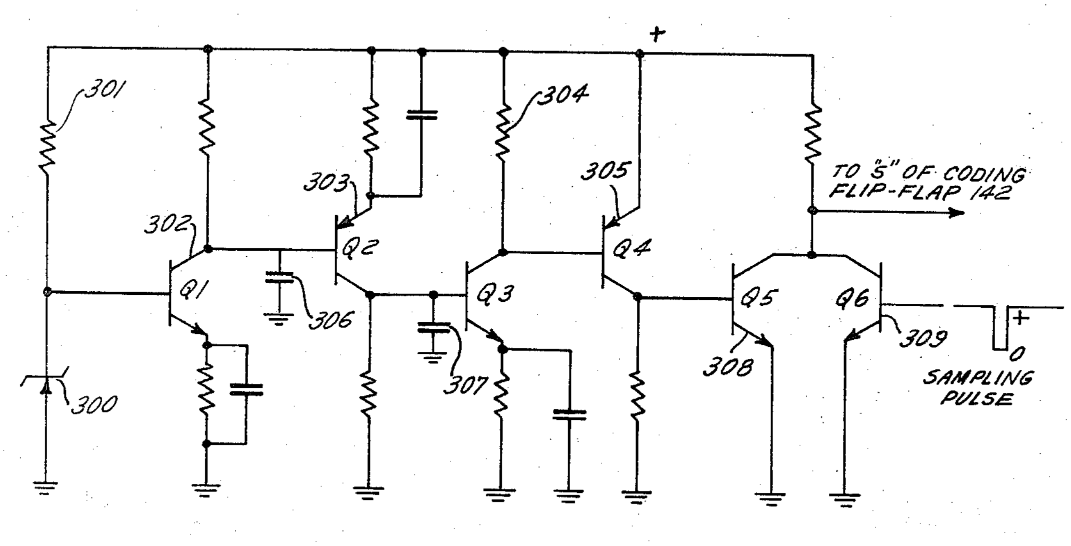
FIG. 6 shows the circuit diagram for the random switching pulse generator of FIG. 3.

FIG. 6 shows the random noise generator and its accompanying sampling gate. In particular a Zener diode 300 is used as a noise generator and has its cathode connected to the positive supply line through a resistor 301. The cathode of Zener diode 300 is further connected to the base of a transistor 302. Transistor 302 and subsequent transistors 303, 304 and 305 serve as amplifiers. Further, some band pass limiting may be accomplished by capacitors 306 and 307, respectively connected from the collectors of transistors 302 and 303 to ground. The output of transistor 305 is connected to the base of a transistor 308 which, in conjunction with transistor 309 constitute an AND gate. Normally transistor 309 is saturated, shortcircuiting the output of transistor 308. A sampling pulse applied at the base of transistor 309 blocks said transistor causing an output to appear at the common collector connection of transistors 308 and 309 in the event that the signal at the base of transistor 308 is negative. This output is furnished to the "S" input of coding flip-flop 142.

Figure 7:
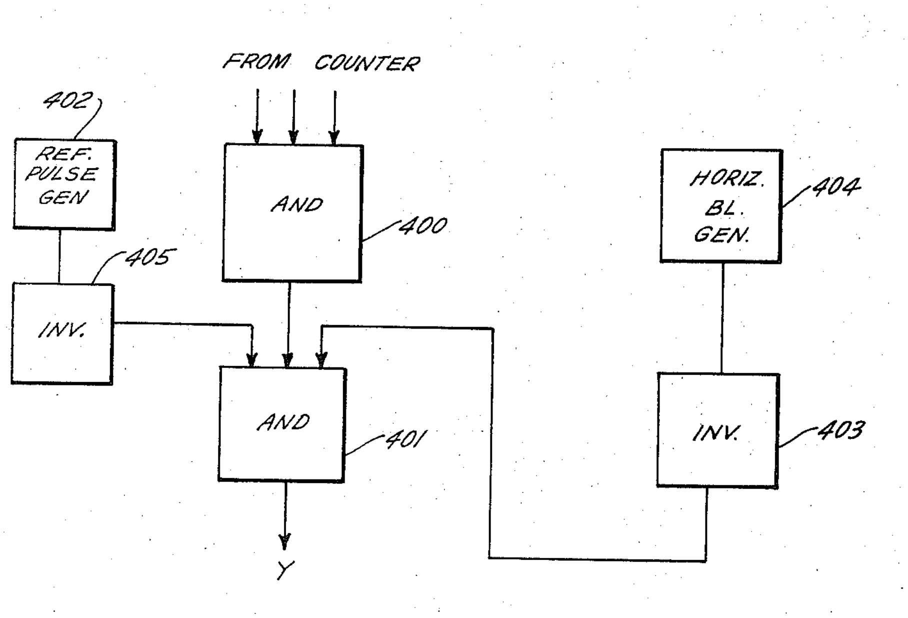
FIG. 7 is a more detailed block diagram showing the generation of the reset gate enable signals.

With reference to FIG. 4, the only thing that still need briefly be discussed is how the outputs WXYZ of the counter 100 are derived in order that not only do they signify the correct count, i.e., permit selection of a particular line in a field, but that the timing is correct to prevent interference with the reference pulse, the horizontal synchronizing pulse, and the color burst. The counter, as is well known, is a binary counter using a plurality of flip-flops. Any particular count can be determined by the correct combination of the outputs of various ones of these flip-flops. Reference to FIG. 7 shows that selected ones of the flip-flops have an output which is combined in and AND circuit 400. The output of AND circuit 400 is combined in a second AND circuit 401 with the inverted blanking and reference pulse generator outputs, derived from reference pulse generator 402 and blanking generator 404. The output of AND gate 401 then constitutes signal Y at the output of counter 100 which, again, is equivalent to signal D of FIG. 3. The timing for the polarity burst gate enable signal, signal Z, is derived in exactly the same fashion as described above. No further discussion is therefore necessary.

The gating signals A and B developed as shown in FIG. 4 are then applied to enable the non-inverting and inverting amplifiers 11 and 12 respectively.

Figure 8:
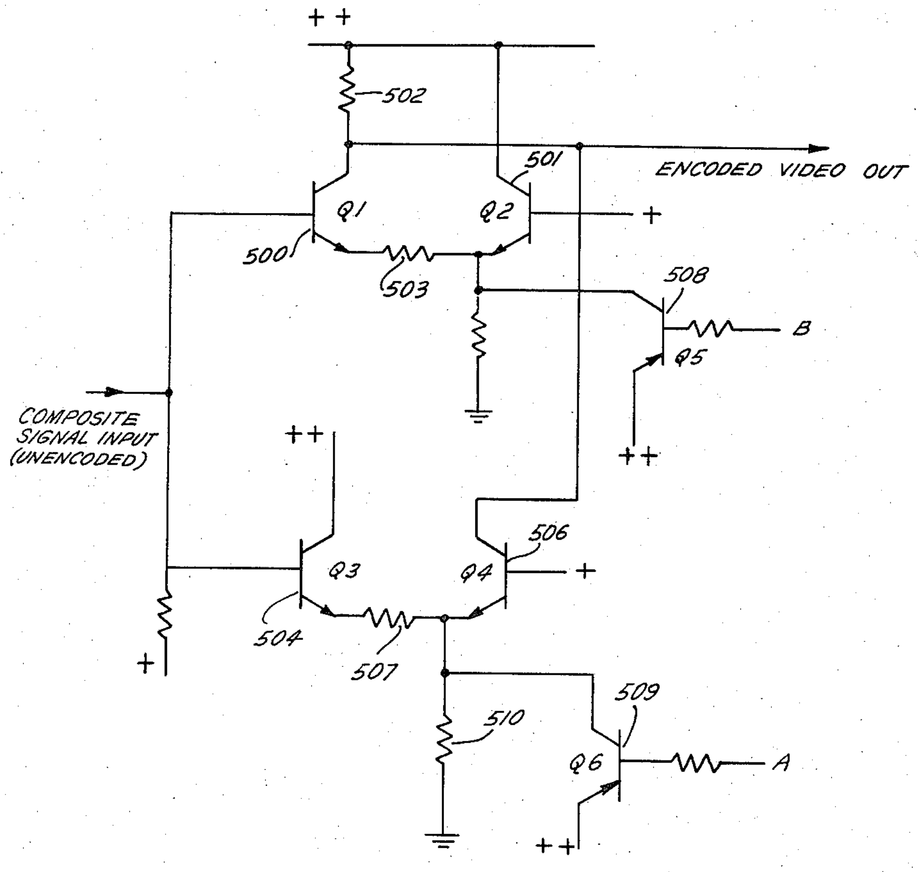
FIG. 8 shows the circuits for the inverting and non-inverting amplifiers of FIG. 3.

FIG. 8 shows the inverting and non-inverting amplifiers. The inverting amplifier comprises a transistor 500 and a transistor 501 which together constitute a differential amplifier. Specifically, the collector of transistor 500 is connected to the positive supply line via a resistance 502, while the collector of transistor 501 is directly connected to said positive supply line. The emitter of transistor 500 is connected to the emitter of transistor 501 by a resistance 503, which determines the gain of the differential amplifier. The emitter of transistor 501 is connected to ground potential via a resistor 505 whose resistance is substantially higher than the resistance of resistor 503. The output of the amplifier is derived from the collector of transistor 800. Further, a transistor 508 has an emitter-collector circuit connected from the ungrounded terminal of resistance 510 to the positive supply line.

The non-inverting amplifier is also a differential amplifier. This differential amplifier comprises transistor 504 and 506 whose emitters are interconnected by a resistance 507. The collector of transistor 504 is directly connected to the positive supply line, while the collector of transistor 506 is connected in common with the collector of transistor 500. This common connection constitutes the output furnishing the encoded television signal. Also, transistor 509 has its emitter-collector circuit connected from the ungrounded terminal of resistance 807a to the positive supply line.

Gating signal B is applied to the base of transistor 508, while gating signal A is applied to the base of transistor 509.

The circuit operates as follows:

The unencoded television signal is applied simultaneously to the bases of both transistor 500 and transistor 504. In the presence of an enable signal B at the base of transistor 508, this transistor is blocked allowing the differential amplifier comprising transistors 500 and 501 to operate normally. In the absence of such enable signal, transistor 508 is conductive, thereby short-circuiting the emitters of transistors 500 and 501 to the positive supply line. This causes both transistors to block, causing the output at the collectors to be substantially the positive supply voltage.

Application of enable signal A to the base of transistor 509 causes the same operation of the non-inverting amplifier, that is the differential amplifier comprising transistors 504 and 506.

Figure 9:
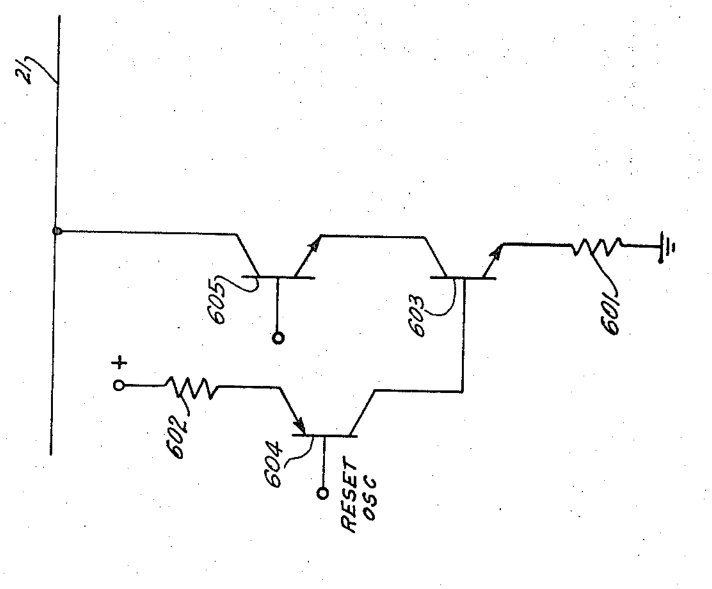
FIG. 9 shows the circuit for the reset burst gate of FIG. 3.

The above-described amplifiers thus furnish at their common output an encoded video signal which has a video portion inverted at a random rate and a synchronizing portion which is unaffected by the encoding process. The only change in the synchronizing signal is the addition of a reference pulse to the front porch of the horizontal sync pulses. It is now required that the reset bursts and the coding bursts be added to the signal prior to modulating the resulting signal onto a suitable carrier. A suitable burst insertion circuit is shown in FIG. 9. The top horizontal line in the Figure, labelled 21, is the video through line, that is the line leading to the collectors of transistors 506 and 500 in FIG. 8. At the time of the reset burst insertion, both the inverting and non-inverting amplifiers must be cutoff in order to prevent interaction between the video signal which is still coming through at this point and the reset burst. The inverting amplifier is cutoff in any case because the polarity flip-flop has been reset at this point. The non-inverting amplifier is cut off by furnishing an inverted Y signal to a third input of AND gate 154 of FIG. 4. FIG. 9 comprises two transistors, namely a transistor 603 and 605 whose emitter-collector circuits are connected in series to the video through-line. The emitter of transistor 603 is connected ground through a resistance 601. The signal Y is applied to the base of transistor 605. The base of transistor 603 is connected to the collector of transistor 604 whose emitter is connected to the positive supply line through a resistance 602. The output of the reset oscillator is applied to the base of transistor 604.

The above-described circuit operates as follows:

Transistor 605 is operated at cut-off, preventing any oscillations from the reset oscillator from reaching the video through line until the arrival of the signal Y. For the duration of the Y signal transistor 605 is made conductive. When transistor 605 is conductive, the reset burst is inserted into the line at D.C. level depending upon the D.C. current flowing through the emitter-collector circuits of transistors 605 and 603.

Said burst has thus been inserted into a video through line at a desired D.C. level and at a time corresponding to the signal Y.

The coding bursts, indicating that the video signal is or is not inverted, are inserted in a similar manner in response to signals C and E respectively. The coding burst insertion circuitry therefore is not illustrated.

The signal appearing on line 21 after the above-described burst injection is suitable for directly-modulation onto a carrier in a standard transmitter. The signal is modulated on the carrier in such a manner that the transmitter clamps to the tip of the reference pulse rather than to the tip of the horizontal sync pulse. Full RF power is developed for the reference pulse as was shown in line D of FIG. 1.

The above-description has concerned only the video portion of the transmitted signal. Encoding of the audio signal also takes place. In accordance with the present invention the program audio signal is modulated onto a square wave carrier having a frequency of 31.5 KHz. The carrier signal may be derived by frequency doubling from the horizontal synchronizing signal. The program audio signal is modulated onto this carrier signal in such a manner that a suppressed carrier modulation signal is generated whose bandwidth is approximately 17 KHz. In addition to the so-encoded program audio signal, in accordance to the present invention, a barker signal is generated which occupies that part of the frequency spectrum normally associated with the program audio signal. The barker signal thus occupies a frequency range up to approximately 15 KHz. This barker signal is to be intelligible at the receiver even without the use of the decoder and is used for advertising the program on the air. It may for example state how long the program has been on, how long the program will continue, and any other information which the subscriber may require before deciding whether or not to pay for the particular program on the air. Care must be taken that when the barker signal modulates the audio transmitter, side bands in excess of 15 KHz are not produced in order that the encoded audio signal may not suffer from interference.

Figure 10A:
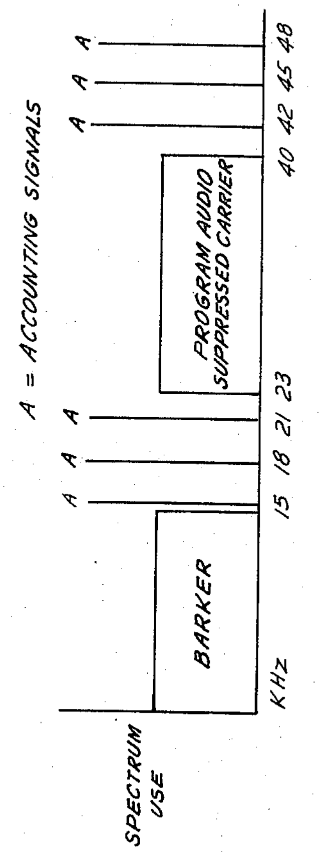
FIGS. 10*a* and 10*b* show, respectively, the spectrum usage and the encoding system for the audio portion of the signals.
Figure 10B:
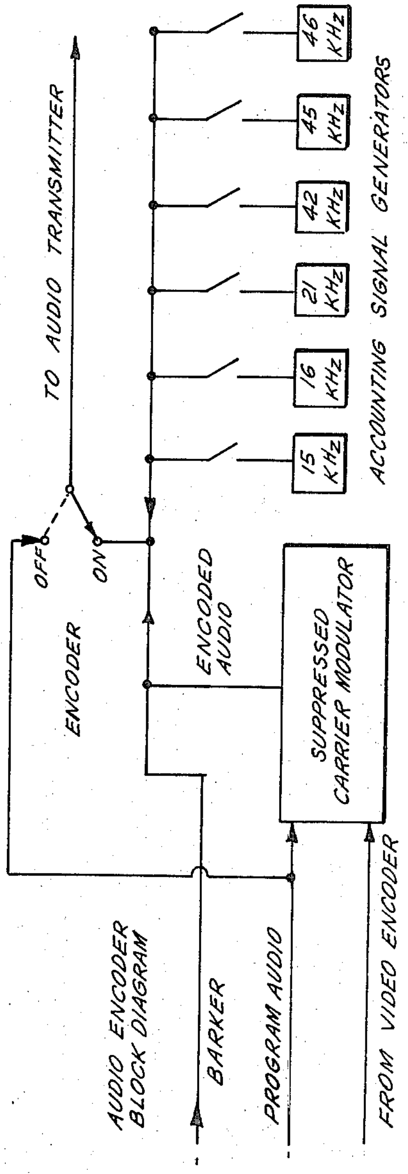

It is further possible in accordance with the present invention to transmit accounting signals in those portions of the band not occupied by either the encoded program audio or the barker signal. As shown in the Figure accounting signals may for example be generated at 18, 21, 42, 45 and 48 KHz. These signals in various combinations may be used to enable the appropriate burst detectors at the decoder so that the video portion of the decoder will function correctly. The system necessary to generate the above wave form is shown in FIG. 10*b*. It is seen that a barker signal is filtered and combined with a program audio signal which has previously been modulated onto a 31.5 KHz signal from the video encoder. The suppressed carrier modulator output is mixed with the filtered barker signal and is further mixed with the signals from various accounting signal generators which are switched into the circuit by switches S1 – S5 in accordance with the desired coding and which, as mentioned above, will activate the video portion of the decoder accordingly. Further shown in FIG. 10*b* is a switch S6 which connects the combined audio signal to the audio transmitter when the encoder is on and disconnects the signal from the audio transmitter when the encoder is off.

Figure 11:
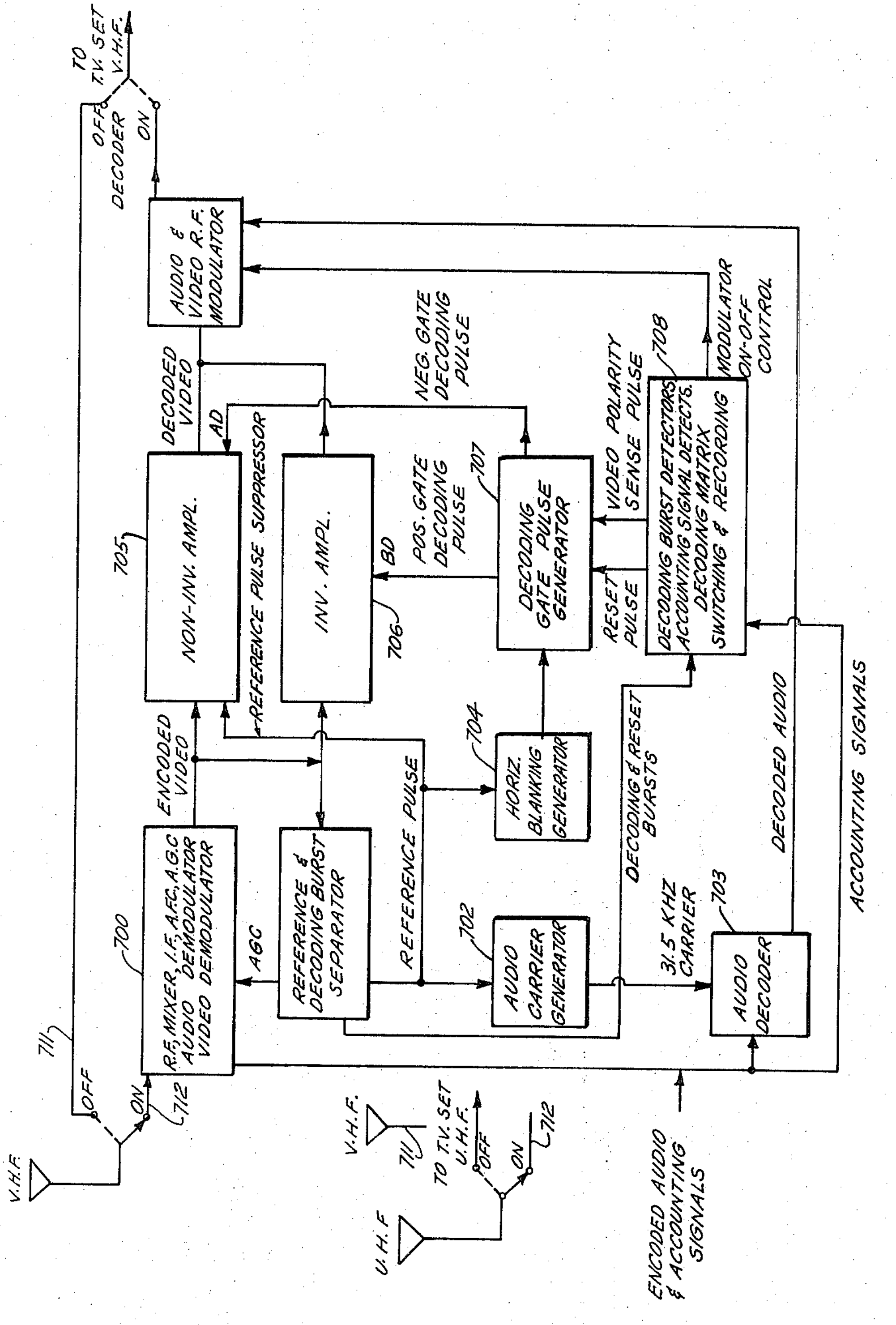
FIG. 11 shows a decoder block diagram.

The above concludes the description of the encoding mechanism required for the present invention. The equipment at the receiver, namely the decoding equipment, will now be described. FIG. 11 is a decoding system block diagram. At this point it must be kept in mind that the received signal contains all vertical and horizontal synchronizing pulses and further contains a reference pulse which occupies the levels normally associated with the horizontal synchronizing pulses. Further, the received signal is a signal whose video portion is at times inverted. It contains coding bursts which indicate whether the next field to be received is or is not inverted. It is thus the function of the decoding system to extract from the received signal the reference signal and the decoding bursts, to cancel the reference signal and to employ the decoding bursts to set gates which will, if necessary, switch the polarity of the video signal, thereby generating a decoded video signal of correct polarity.

The incoming signal is applied to a decoder having the standard input circuits of a television receiver, namely to the RF stage, and hence passes through the mixer, the IF stage, the audio demodulator and the video demodulator. Here it must be noted that for the automatic gain control circuits the reference pulse is used. This is discussed in detail in connection with FIG. 12 below. It suffices to state here that the top of the reference pulse serves as a reference level through-out the decoder. The output of block 700 is thus the encoded composite television signal having the reference pulses and having, for some fields, an inverted video signal. From this encoded television signal are separated the reference pulse and the decoding bursts in block 701. Since the reference pulse and the decoding bursts are at a level far removed from that of the synchronizing and video signals, the separation of the reference pulse and of the decoding bursts can be made simply by means of a circuit biased to eliminate the standard television signal (See also FIG. 2). The reference pulse, besides being used to clamp the level of the signal by use in the automatic gain control circuit is also used to cancel out the reference pulse in the final decoded signal. It is further used to activate an audio carrier generator for reinsertion of the audio carrier into the encoded audio signal. The audio decoder 703, shown as connected to the audio carrier generator 702, also contains a demodulator circuit. Its output is therefore a decoded audio signal.

The reference pulse derived from unit 701 is further used for a generating horizontal blanking signals, that is, it triggers horizontal blanking generator 704. Further reference to FIG. 11 shows that the output signal from unit 700, namely the encoded television signal is applied to a non-inverting amplifier and an inverting amplifier just as was done in the encoder. It is thus required to furnish enabling signals for the non-inverting and the inverting amplifier just as was required in the encoder. In FIG. 11, the non-inverting amplifier has reference numeral 705, while the inverting amplifier has reference numeral 706. Again it is necessary to furnish a signal to enable the non-inverting amplifier 705 during all synchronizing intervals and during those portions of the signal wherein non-inverted video is present in the encoded signal. The inverting amplifier 706 is enabled only when the encoded signal has video portions which have been inverted at the encoder. The enabling signal for the non-inverting amplifier is furnished on a line labelled $A_D$, while the signal enabling inverting amplifier 706 is furnished on a line labelled $B_D$. As will be shown in detail in the description of FIG. 14, lines $A_D$ and $B_D$ are controlled by the outputs of a flip-flop. The flip-flop is reset prior to each field by a reset pulse derived from the rest burst. The video polarity sense pulse derived from the coding bursts signifying an inversion is then used to switch the decoding gate flip-flop in such a manner that an output on line $B_D$ results which cause the inverting amplifier to become operative. In the absence of such a video polarity sense pulse the flip-flop remains in the state wherein the signal $A_D$ is furnished, causing the non-inverting amplifier to be operative. The outputs of amplifier 705 and 706 are then combined and furnish a decoded video signal. This decoded video signal is modulated onto a carrier which is available in the area. The resulting signal is a standard television signal and is applied directly to the subscriber's television receiver. The circuits required in the block diagram shown in FIG. 11 will now be described in detail with reference to FIGS. 12, 13 and 14.

Figure 12:
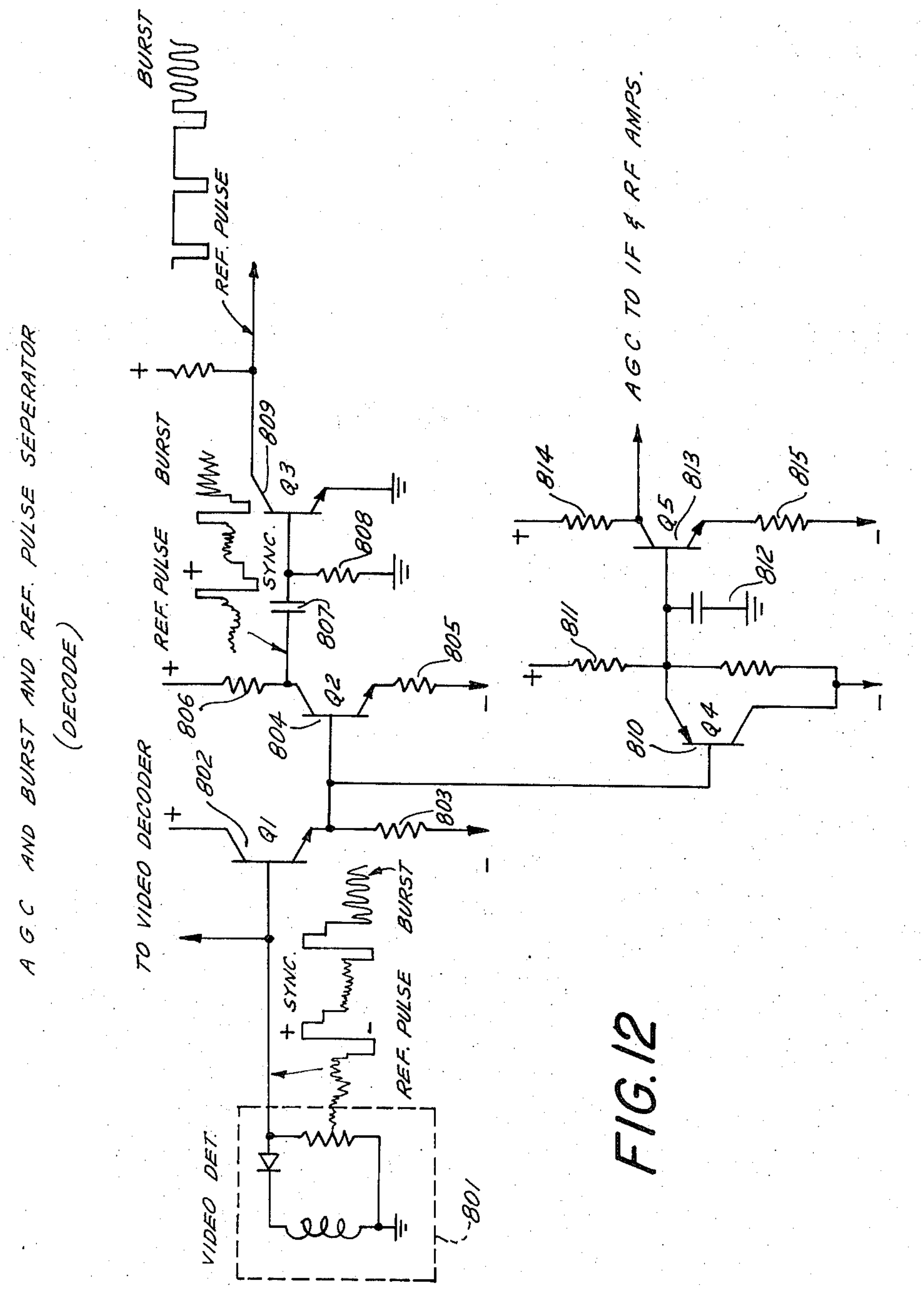
FIG. 12 shows the circuits for the reference pulse and burst separator of FIG. 11.

FIG. 12 shows the burst and reference pulse separator circuit diagrams as well as a circuit for deriving an AGC signal from the reference pulse. The received composite encoded television signal after passing through the standard RF and IF stages is demodulated in demodulator 801. The so-demodulated signal is applied to an emitter-follower circuit comprising a transistor 802 having an emitter resistor 803. The voltage across the emitter-resistor 803 is applied, first, to the base of a transistor 804 whose emitter is connected to the positive line via a resistance 806. The signal derived from the collecter of transistor 804 is applied to the base of a transistor 809 through a capacitance 806. The base of transistor 809 is further connected to ground via a resistor 808. The biasing of transistor 809 is such that only the reference pulse and the burst pulses appear at the collector of transistor 809.

The signal at the emitter of transmitter 802 is further applied to the base of a transistor 810. Transistor 810 is biased to cutoff until a highly negative signal, namely the reference pulse and the burst pulses appear at the collector of transistor 809.

The signal at the emitter of transistor 802 is further applied to the base of a transistor 810. Transistor 810 is biased to cutoff until a highly negative signal, namely the reference pulse, appears at its base. The signal at the emitter of transistor 810 is integrated by use of a capacitor 812 connected between said emitter and ground. The voltage across capacitor 812 is applied to the base of a transistor 813 whose collector is connected to the positive supply line through a resistance 814, while its emitter is connected to a negative supply via resistor 815. The output resulting at the collector of transistor 813 is a substantially steady DC level which is applied for automatic gain control to the IF and RF amplifiers.

Figure 13:
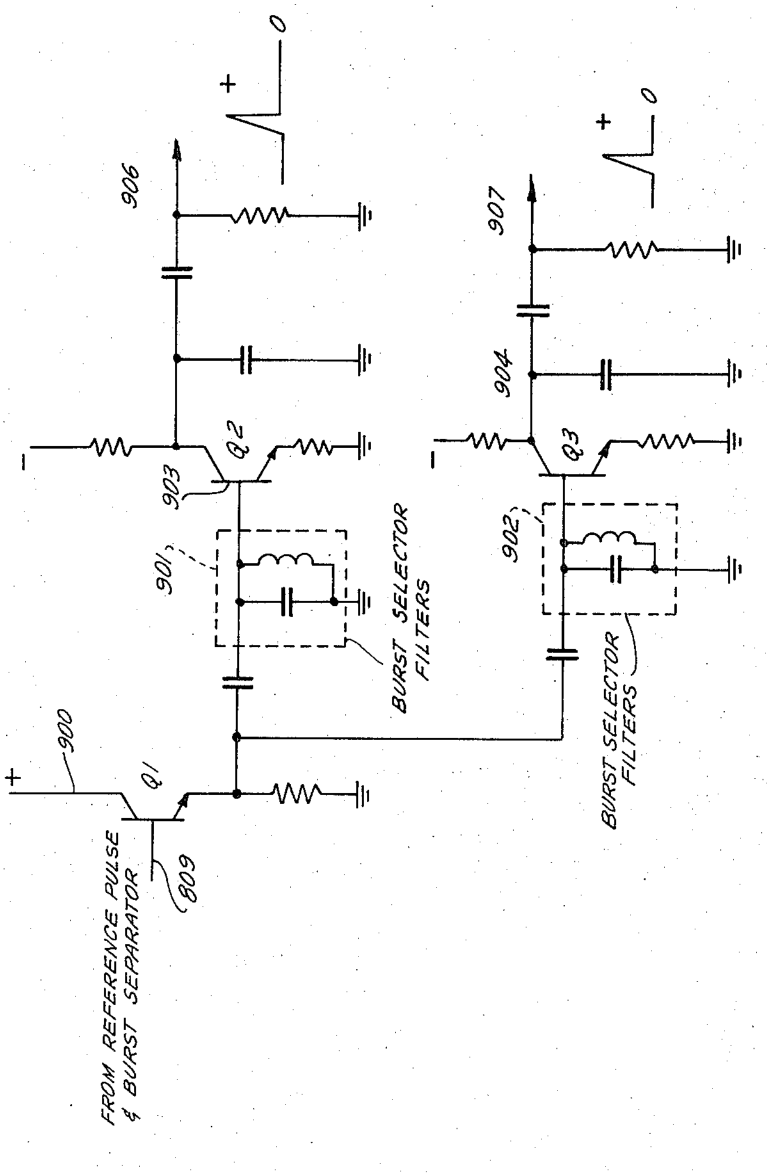
FIG. 13 shows the circuit for generating the reset and decode triggers.

As shown in FIG. 13, the signals from the collector of transistor 809 of FIG. 12 are applied to the base of a transistor 900. The transistor, connected as an emitter follower, forms the input of the circuit generating the reset and decode triggers from the bursts. Specifically the signal at the emitter of transistor 900 is simultaneously applied to a tuned circuit tuned to the frequency of the reset burst (901) and a second tuned circuit (902) tuned to the frequency of the decode burst. The output of the reset burst tuned circuit is applied to transistor 903 which with its associated circuitry constitutes the reset burst detector, while the output of tuned circuit 902 is connected to the base of a transistor 904 constituting a decode burst detector. The signals at collectors of transistors 903 and 904 after passage through respective low pass filters cause the generation of the reset trigger and decode trigger respectively.

Figure 14:
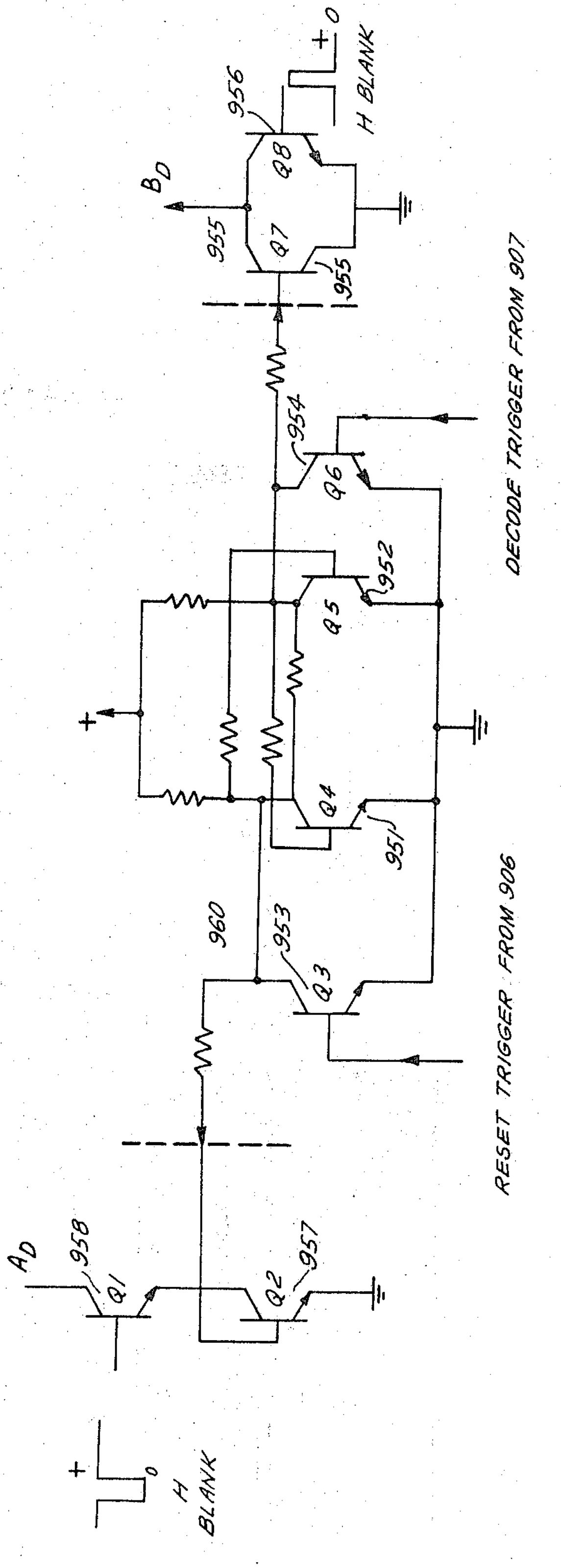
FIG. 14 shows the circuit for furnishing the enabling signals for the inverting and non-inverting amplifiers of the decoder.

The so-generated reset and decode triggers in turn control, at least in part, the circuit for generating the enabling signals for the inverting and non-inverting amplifier in the decoder, which will now be described with reference to FIG. 14. As shown in said figure, the circuit comprises in the main a flip-flop having transistors 951, 952, 953 and 954. Transistors 951-954 all have emitters connected to ground potential. The collector of transistor 951 is connected directly to the collector of transistor 953, while the collector of transistor 954 is directly connected to the collector of transistor 952.

Each pair of collectors is connected to the positive supply lines through a resistance and, further, the collectors of transistors 951 and 953 are resistance-coupled to the base of transistor 952 while the collectors of transistors 952 and 954 are resistance coupled to the base of transistor 951. The reset trigger derived from terminal 906 is applied at the base of transistor 953, while the decode trigger derived from terminal 907 is applied to the base of transistor 954. The collector of transistors 958 is connected to line $A_D$. The horizontal blanking signal is applied with negative polarity at the base of transistor 958. Further the collectors of transistors 952 and 954 are resistance coupled to the base of a transistor 955 whose emitter-collector circuit is connected in parallel with that of a transistor 956. The signal appearing at the output of the commonly connected collectors of transistors 956 and 960 is the signal on line $B_D$.

The above described circuit operates as folows: Assume a reset trigger signal is applied to the base of transistor 953. This causes the transistor to become conductive, causing voltage at its collector to drop. This in turn causes the cut-off of transistor 957. When transistor 957 is off, line $A_D$ is disconnected from ground and the non-inverting amplifier is on. Similarly the application of a negative pulse during the horizontal blanking interval at the base of transistor 958 causes this transistor to run off, again causing the non-inverting amplifier to be operative.

Following the application of the reset trigger from terminal 906, the collector of transmistor 954 is at high potential, causing transistor 955 to be conductive. This in turn connects line $B_D$ to ground potential thereby causing the inverting amplifier to be inoperative. Further, transistor 956 is normally operated at cut-off but becomes conductive during the horizontal blanking interval by the application of the horizontal blanking pulse with positive polarity to the base of said transistor. This in turn connects the line $B_D$ to ground, again assuring that the inverting amplifier is inoperative during the horizontal blanking intervals.

Application of the decode trigger from terminal 907 causes transistor 954 to become conductive, thereby causing the flip-flop to switch state. In this second state the collector of transistor 954 is at a low potential causing transistor 955 to be cut off. Since transistor 956 is cut off except during the horizontal blanking interval, the cut-off of transistor 955 causes terminal $B_D$ to be disconnected from ground. Under these conditions transistor 508 of FIG. 8 is non-conductive, the inverting amplifier thus being operative. Only when a horizontal blanking signal is applied with positive polarity to the base of transistor 956 in line $B_D$ again connected to ground potential, thereby causing transistor 508 to become conductive, blocking the inverting amplifier. This mode of operation will continue until the application of the next reset trigger signal. This occurs just prior to the next subsequent vertical blanking interval. The decode unit is thus always set to operate the non-inverting amplifier during the vertical blanking interval and will continue to operate with the non-inverting amplifier unless a decode trigger is received. The use of such a reset pulse thus allows particularly simple equipment to be used at the decoder. Of course it is much more important that the decoder unit be inexpensive than the encoder unit. This thus represents a very favorable embodiment of the present invention.

It should also be noted that, in the above discussion, reference was made to FIG. 8 which shows the inverting and non-inverting amplifiers may be used in the decoder units and therefore no additional figure is required.

It will be noted that the system has been described in particular with a reference pulse on the front pulse of the horizontal synchronizing pulse. Of course the reference pulse could also be inserted at other times within the composite television signal which contains signals independent of picture content. Further of course the video portion of the signal could be inverted at a predetermined rate, rather than in the random fashion described herein. The inversion, the introduction of the reference pulse, the generation and the introduction of the bursts into the composite signals can of course be accomplished with other circuits than those disclosed herein. The circuits disclosed herein constitute a preferred embodiment, but it is not intended that the invention be limited thereto.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended.

1. Method of encoding a composite television signal having a video signal with a determined black level signifying picture black, and synchronizing signals having a determined synchronizing level and polarity relative to said black level, for reception on receiving means requiring a predetermined minimum pulse width for synchronization, comprising, in combination, the steps of generating a sequence of reference pulses having a polarity opposite to said synchronizing polarity and a pulse width less than said predetermined minimum pulse width, each displaced by a determined time interval from a corresponding one of said synchronizing signals; combining said reference pulses with said composite television signal, thereby creating a second television signal; generating a video carrier signal; and modulated said video carrier signal with said second television signal in such a manner that said reference pulse is transmitted at substantially peak transmitter power, said so-modulated video carrier signal constituting a transmitter signal.

2. A method as set forth in claim 1 wherein each of said reference pulses has a reference pulse amplitude, said transmitter signal having a reference level corresponding to said reference pulse amplitude; further comprising the step of clamping said transmitter signal to said reference level.

3. A method as set forth in claim 1, wherein said composite television signal has an associated program audio signal; further comprising the step of furnishing an encoder audio carrier signal, and modulating said program audio signal on said encoder audio carrier signal in such a manner that a suppressed carrier signal is furnished.

4. A method as set forth in claim 3, further comprising the step of furnishing a barker audio signal; and combining said barker audio signal with said suppressed carrier signal.

5. A method as set forth in claim 1, wherein said synchronizing signals comprise horizontal synchronizing pulses and vertical synchronizing pulses; and wherein said step of generating a sequence of reference pulses comprises the step of generating a reference pulse in response to each of said horizontal synchronizing pulses.

6. A method as set forth in claim 5, wherein said synchronizing signals comprise horizontal synchronizing pulses, and vertical synchronizing pulses; wherein said step of generating a sequence of reference pulses comprises the step of generating a reference pulse in response to each of said horizontal synchronizing pulses in such a manner that the trailing edge of a reference pulse substantially coincides in time with the leading edge of a corresponding one of said horizontal synchronization pulses.

7. A method as set forth in claim 5, further comprising the step of generating video inverter signals independent of said reference pulses; and inverting said video signal in response to each of said video inverter signals.

8. A method as set forth in claim 7 wherein said composite television signal comprises a vertical blanking interval; and wherein generating video inverter signals comprises generating noise signals randomly having a first or second polarity; sampling said noise signals during said vertical blanking; interval and generating a video inverter signal in response to a so-sampled noise signal of first polarity.

9. A method as set forth in claim 8, wherein inverting said video signal in response to each of said video inverter signals comprises inverting said video signal for the subsequent field of said composite television signal.

10. A method as set forth in claim 9, further comprising the step of generating an encoding burst in response to each of said video inverter signals; and combining said encoding burst with said composite television signal.

11. A method as set forth in claim 10, further comprising the step of generating horizontal blanking pulses.

12. A method as set forth in claim 11, wherein combining said encoding burst with said composite television signal comprises inserting said encoding burst between the trailing edge of a selected horizontal blanking pulse and the leading edge of the reference pulse subsequent to said selected horizontal blanking pulse during said vertical blanking interval, thereby furnishing a final transmitter signal.

13. A method as set forth in claim 12, further comprising the step of transmitting said final transmitter signal.

14. A method as set forth in claim 13, further comprising the step of receiving and demodulating said final transmitter signal.

15. A method as set forth in claim 14, further comprising the step of separating said reference pulse and said encoding burst from said demodulated signal.

16. A method as set forth in claim 15, further comprising the step of generating an AGC signal corresponding to the amplitude of said so-separated reference pulse.

17. A method as set forth in claim 16, further comprising the step of reinverting said video signal during the field immediately subsequent to a so-separated encoding burst thereby furnishing a composite television signal having a decoded video signal.

18. A method as set forth in claim 17, further comprising the step of furnishing a second carrier signal; and modulating said composite television signal having said decoded video signal onto said second carrier signal, thereby furnishing a standard television signal.

19. Method of encoding a composite television signal having a video signal portion and having vertical blanking intervals, comprising, in combination, the step of generating a video inverter signal during a randomly selected one of said vertical blanking intervals of said composite television signal; inverting only said video portion of said composite television signal throughout the field following generation of said video inverter signal; generating an encoding signal; and inserting said encoding signal into said composite television signal in response to said video inverter signal, thereby creating an encoded composite television signal wherein the presence of said encoding signal indicates inversion of said video portion throughout the subsequent field.

20. A pay television system, comprising, in combination, standard composite television signal furnishing means for furnishing a composite television signal having a plurality of fields, each of said fields comprising a plurality of lines, vertical synchronizing signals, horizontal synchronizing signals, and a video signal with a determined black level signifying picture black; inverting and non-inverting amplifier means each having an input connected to said standard composite television signal furnishing means, each of said amplifier means further having an output; connecting means directly connecting the output of said non-inverting amplifier means to the output of said inverting amplifier means; synchronizing signal separator means having a first sync output furnishing horizontal synchronizing pulses and a second sync output furnishing vertical synchronizing pulses; gating generator means having a first output connected to said non-inverting amplifier means and a second output connected to said inverting amplifier means for selectively enabling each of said amplifier means during determined portions of said composite television signal, said gating generator means further comprising counter means having a counting input connected to said first sync output and a reset input connected to said second sync output, said counting means furnishing counting signals each corresponding to the number of one of said lines within one of said fields; reference pulse generator means connected to said synchronizing signal separator means for furnishing a reference pulse in response to each of said so-separated horizontal synchronizing pulses and at a determined time instance relative thereto; and first circuit means for inserting said reference pulses into said composite television signal.

21. An arrangement as set forth in claim 20, wherein said counting means comprises binary counting means having a plurality of counting stages.

22. An arrangement as set forth in claim 20, further comprising noise signal generating means furnishing noise signals randomly having a first or second polarity; and wherein said gating generator means comprises means sampling said noise signals and generating a video inverter signal in response to a so-sampled noise signal of first polarity, whereby said video inverter signal is generated in a substantially random manner.

23. An arrangement as set forth in claim 22, wherein said sampling means comprises first flip-flop means having a set and reset input; and switch means connecting the output of said noise signal generating means to said set input of said first flip-flop means in response to a first selected one of said counting signals.

24. An arrangement as set forth in claim 23, further comprising means connecting said reset input of said first flip-flop means to said counting means for resetting said flip-flop in response to a second selected one of said counting signals.

25. An arrangement as set forth in claim 24, further comprising reset burst generator means for furnishing a reset burst; and reset gating means connecting said reset burst generator means to said output of said inverting and non-inverting amplifier means in response to said second selected one of said counting signals.

26. An arrangement as set forth in claim 25, wherein said composite television signal comprises vertical blanking intervals; and wherein said second selected one of said counting signals is the counting signal corresponding to the line immediately preceeding said vertical blanking interval, whereby said reset burst is inserted into said composite television signal immediately prior to each of said vertical blanking intervals.

27. An arrangement as set forth in claim 26, further comprising horizontal blanking signal generator means furnishing horizontal blanking signals; and wherein said gating generator means comprises first logic circuit means furnishing a timed second selected counting signal in response to said second selected one of said counting signals in the absence of said reference pulse and said horizontal blanking signal.

28. An arrangement as set forth in claim 27, wherein said reset input of said first flip-flop means and said reset gating means are connected to the output of said first logic circuit means.

29. An arrangement as set forth in claim 28, further comprising first and second coding signal generator means; first and second gate means respectively connecting said first or second coding signal generator means to said output of said inverting and non-inverting amplifier in response to a first and second coding enable signal; and means furnishing said first and second coding enable signal in response to a third selected one of said counting signals and, respectively, said set and reset state of said first flip-flop means.

30. An arrangement as set forth in claim 29, further comprising polarity flip-flop means having a set input and a reset input, said polarity flip-flop means further having a "1" output in response to a signal at said set input and a "0" output in response to a signal at said reset input; second logic circuit means furnishing a signal to said set input of said polarity flip-flop means in response to the simultaneous presence of set state in said first flip-flop means and a fourth selected one of said counting signals; and means directly connecting the reset input of said polarity flip-flop means to the reset input of said first flip-flop means.

31. An arrangement as set forth in claim 30, further comprising third logic circuit means connected between said reference pulse generator means, said horizontal blanking generator means, said polarity flip-flop means and said first output of said gating generator means for furnishing a signal energizing said non-inverting amplifier means in the presence of said "0" output of said polarity flip-flop means, or the presence of said horizontal blanking signal, simultaneously with the absence of said reference pulse and said second selected one of said counting signals.

32. An arrangement as set forth in claim 30, further comprising fourth logic circuit means interconnected between said polarity flip-flop means, said reference pulse generator means, said horizontal blanking generator means and said second output of said gating generator means, for furnishing a signal enabling said inverter amplifier means in the presence of said "1" output of said polarity flip-flop means and the simultaneous absence of said reference pulse and said horizontal blanking signal.

33. Pay television transmitting system for transmitting a television signal for reception on receiving means requiring a predetermined minimum pulse width of synchronization, comprising, in combination, standard composite television signal furnishing means for furnishing a composite television signal having a video signal with a determined black level signifying picture black; synchronizing signal separator means for separating horizontal synchronizing signals from said composite television signal; reference pulse generator means connected to said synchronizing signal separator means for furnishing a reference pulse having a pulse width less than said predetermined minimum pulse width in response to each of said so-operated horizontal synchronizing pulses and at a determined time instant relative thereto; and circuit means for inserting said reference pulses into said composite television signal.

34. Pay television system, comprising, in combination, standard composite television signal furnishing means for furnishing a composite television signal having a video signal with a determined black-level signifying picture black; synchronizing signal separator means for separating horizontal synchronizing signals from said composite television signal; reference pulse generator means connected to said synchronizing signal separator means for furnishing a reference pulse in response to each of said so-separated horizontal synchronizing pulses and at a determined time instant relative thereto; circuit means for inserting said reference pulses into said composite television signal; inverting and non-inverting amplifier means each having an input connected to said standard composite television signal furnishing means, each of said amplifier means further having an output; connecting means directly connecting the output of said non-inverting amplifier means to the output of said inverting amplifier means; and gating generator means having a first output connected to said non-inverting amplifier means and a second output connected to said inverting amplifier means for selectively enabling each of said amplifier means during determined portions of said composite television signal.

35. An arrangement as set forth in claim 34, wherein said inverting amplifier means comprises first differential amplifier means having a first and second transistor, each of said transistors having a base, collector, and emitter; wherein said composite television signal is applied to the base of said first transistor; wherein a fixed potential is applied to the base of said second transistor; and wherein the output of said first differential amplifier is the collector of said first transistor.

36. An arrangement as set forth in claim 34, wherein said gating generator means comprises means enabling said non-inverting amplifier means during all horizontal and vertical blanking intervals of said composite television; and wherein said gating signal generator means further comprises means enabling said inverting amplifier means only during selected ones of said video portions of said composite television signal.

37. An arrangement as set forth in claim 36, wherein said non-inverting amplifier means comprises a second differential amplifier, said second differential amplifier comprising a second and third transistor, each of said second and third transistors having a base, collector and emitter; wherein said composite television signal is applied to the base of said third transistor; means applying a fixed voltage to the base of said fourth transistor; and wherein said output of said non-inverting amplifier means is the collector of said fourth transistor.

38. An arrangement as set forth in claim 37, further comprising means furnishing a blocking potential; additional transistor means having an emitter-collector circuit connected between said means furnishing a blocking potential and a selected circuit point of said first differential amplifier means, said additional transistor means further having a base; and wherein said gating generator means comprise means blocking current flow in said base circuit of said additional transistor means to enable said first differential amplifier means.

39. An arrangement as set forth in claim 36, wherein said gating generator means comprise logic circuit means connected to said reference pulse generator means, for blocking both said inverting and non-inverting amplifier means in response to each of said reference pulses, whereby each of said reference pulses is inserted into said composite television signal.

40. Pay television system, comprising, in combination, means for furnishing an encoded television signal having a plurality of fields, inverted video signals only during selected ones of said fields, horizontal synchronizing signals, and a reference pulse associated with each of said horizontal synchronizing signals, said encoded television signal further having decoding bursts present during the vertical blanking times preceeding each of said fields having said inverted video signals; and decoding means for furnishing a standard television signal upon receipt of said encoded television signal, said decoding means comprising inverting means for inverting the video signals of the subsequent field upon receipt of one of said decoding bursts, means for separating each of said reference pulses from said encoded television signal, means for furnishing a reference pulse suppressor signal in response to each of the so-separated reference pulses, and means for applying said reference pulse suppressor signals to said composite television signal in such a manner that said reference pulses are suppressed at least in part.

41. Method of encoding the audio portion of a composite television signal having horizontal synchronizing pulses occurring at a horizontal synchronizing pulse frequency and having an associated program audio signal, comprising, in combination, the steps of furnishing an encoder audio carrier signal having a frequency which is an integral multiple of said horizontal synchronizing pulse frequency; modulating said program audio signal onto said encoder audio carrier signal in such a manner that a suppressed carrier signal is furnished; furnishing a barker audio signal; combining said barker audio signal with said suppressed carrier signal; and transmitting the so combined signals.

42. Pay television transmitter system for transmitting an encoded television signal for reception on television receiver means requiring pulses having at least a predetermined value of a determined characteristic for synchronization, comprising, in combination, standard composite television signal furnishing means for furnishing a composite television signal having a video signal with a determined black level signifying picture black and having horizontal synchronizing pulses having a synchronizing polarity relative to said black level; synchronizing signal separator means for separating horizontal synchronizing pulses from said composite television signals; reference pulse generator means connected to said synchronizing signal separator means for furnishing a reference pulse in response to each of said so-separated horizontal synchronizing pulses and at a determined time instant relative thereto, said reference pulses having a value of said determined characteristic less than said predetermined value and a polarity opposite to said synchronizing polarity; circuit means connected to said reference pulse generator means for inserting said reference pulses into said composite television signal, thereby creating an encoded television signal; and means connected to said circuit means for transmitting said encoded television signal in such a manner that said reference pulses have said synchronizing polarity.

43. An arrangement as set forth in claim 42, further comprising synchronizing signal separator means connected to said standard composite signal furnishing means for furnishing horizontal synchronizing pulses; timing circuit means furnishing a timing signal varying as a predetermined function of time following receipt of each of said horizontal synchronizing signals; and threshold means connected to said timing circuit means for furnishing said reference pulse in response to a predetermined amplitude of said timing signal.

44. An arrangement as set forth in claim 43, wherein said timing circuit means comprises capacitor means and transistor means connected in parallel with said capacitor means for discharging said capacitor means in response to each of said horizontal synchronizing signals.

45. An arrangement as set forth in claim 42, further comprising transmitter means for transmitting said composite television signal with said reference pulses in such a manner that said reference pulses are transmitted at RF power levels normally occupied by said horizontal synchronizing pulses.

* * * * *